United States Patent [19]

Yamazaki

[11] 4,133,563

[45] Jan. 9, 1979

[54] PIPE JOINT

[76] Inventor: Sadayoshi Yamazaki, 2-12-5, Takaodai, Suma Ward, Kobe City, Hyogo, Japan

[21] Appl. No.: 766,345

[22] Filed: Feb. 7, 1977

[30] Foreign Application Priority Data

Feb. 12, 1976 [JP] Japan .................................. 51/14174

[51] Int. Cl.² ............................................. F16L 21/00
[52] U.S. Cl. ...................................... 285/231; 285/345
[58] Field of Search ............... 285/231, 260, 423, 230, 285/345; 277/207 A

[56] References Cited

U.S. PATENT DOCUMENTS

| 2,245,153 | 6/1941 | McWane | 285/231 |
|---|---|---|---|
| 2,432,592 | 12/1947 | Stecher et al. | 285/231 |

FOREIGN PATENT DOCUMENTS 1498423  9/1967  France .................................. 285/231

Primary Examiner—Dave W. Arola
Attorney, Agent, or Firm—Oblon, Fisher, Spivak, McClelland & Maier

[57] ABSTRACT

A pipe joint having a socket provided with an annular groove for receiving a rubber ring seal, the internal surface of the socket having two conic parts axially diverging from the circumferential edges of the annular groove to the opposite directions along two conic surfaces with an identical vertical angle, respectively.

2 Claims, 12 Drawing Figures

FIG.9　FIG.8　FIG.7
FIG.10
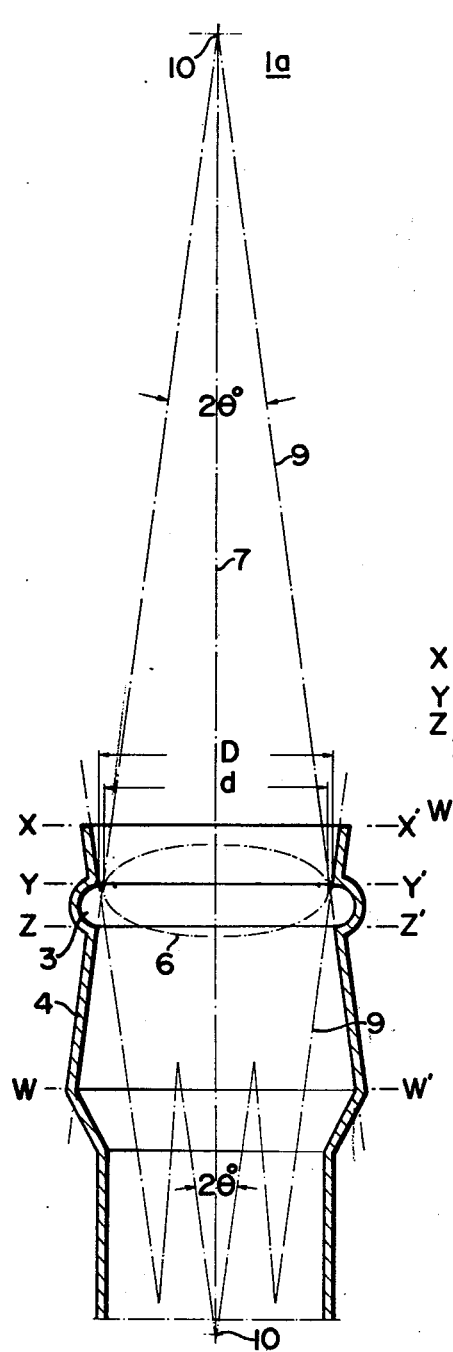
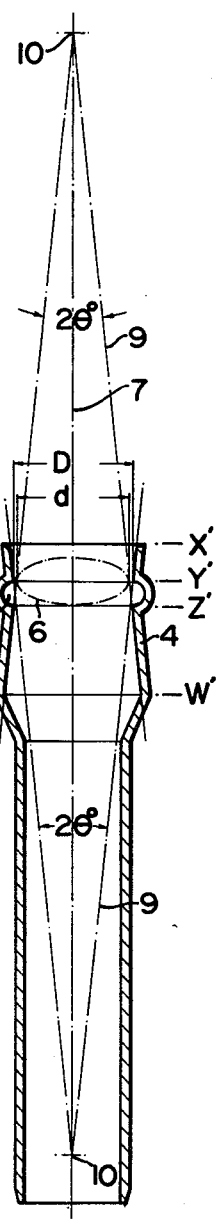
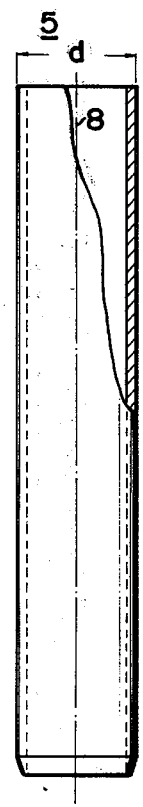

PIPE JOINT

BACKGROUND OF THE INVENTION

1. Field of the Invention

The present invention relates to a pipe joint, and more particularly to a pipe joint having a socket which, even when a pipe inserted therein is inclined with respect to the axis thereof, can prevent the pipe and joint from being subjected to excessive stresses or breakage and can also prevent a rubber ring seal mounted therein from being easily dislocated or slipping off due to internal pressures.

2. Description of the Prior Art

Typical examples of the conventional pipe joint provided with an annular groove for receiving a rubber ring seal will be hereinafter described with reference to FIGS. 1 to 6, which are longitudinal sectional views of the examples, respectively, of the conventional pipe joint shown with a pipe inserted in the socket thereof.

In all of these examples, the clearance between the internal surface of the socket and the outside surface of the pipe inserted in the socket is made as small as possible at sections X—X', Y—Y', Z—Z', W—W', etc., so that accidents such as water leakage may not occur which may be caused by dislocation or slipping-off of the rubber ring seal from the groove due to internal pressures in the pipe joint. For this reason, the allowable limit of the pipe inclination necessary and very significant for the pipe joint is inevitably limited to a very small value. In the case of the conventional pipe joint having such a relationship between the shape, dimension, etc., of the socket and those of the inserted pipe as shown in FIGS. 1 to 6, in fact, the inserted pipe when actually in use is subjected to a levering action in the socket and thereby is exposed to high pressures at portions in point contact even when slightly inclined with respect to the axis of the socket or joint. In this case, the pipe inserted in the socket and inclined with respect to the axis thereof tends to be strongly pressed against the internal surface of the socket at the side on Section Y—Y' toward which the pipe is inclined. As a result, the portions in point contact are subjected to large stresses and deformations; and, in addition, the clearance between the internal surface of the socket and the outside surface of the pipe inserted in the socket and inclined with respect to the axis thereof becomes larger at the side on Section Y—Y' opposite to which the pipe is inclined, until it reaches a value almost corresponding to the difference between the inside diameter of the socket and the outside diameter of the inserted pipe. The occurrence of such a large clearance (refer to JIS B 2406-1967, page 25, FIG. 9: Explanation of the shape and size of the O-ring groove) tends to cause the rubber ring seal in the groove to be easily dislocated or slip off passing through the above large clearance due to internal pressures in the socket. Consequently, the pipe joint of this type is usually compelled to take a form as shown in FIG. 6, in which the clearance between the inside surface of the socket and the outside surface of the inserted pipe is made as small as possible. The examples of such a pipe joint can be clearly seen from the standard of the shapes, dimensions, dimensional tolerances, etc., of pipe joints and the appended drawings set up by the Japan Polyvinyl Chloride Tubing and Pipe Joint Association on Apr. 22, 1974 concerning hard polyvinyl chloride RR single-supported straight pipes for aqueduct, hard polyvinyl chloride RR specials for aqueduct, cast iron RR specials for hard polyvinyl chloride pipes for aqueduct, etc.

However, the pipe joint of this type has various advantages in use and operation in spite of the above disadvantages.

Accordingly, all the related manufacturers and users have been eagerly hoping for the advent of an improved pipe joint that can satisfactorily prevent the occurrence of extraordinarily great stresses therein or breakage thereof, dislocation or slipping-off of the rubber ring seal from the groove formed therein, etc., even if the inserted pipe is inclined at 4° to 5° with respect to the axis of the socket.

SUMMARY OF THE INVENTION

It is the primary object of the present invention to provide a pipe joint which can prevent the occurrence of extraordinarily great stresses therein or breakage thereof, dislocation or slipping-off of the rubber ring seal from the groove formed therein, etc., even if the inserted pipe is inclined at 4 to 5 degrees or more with respect to the axis of the socket thereof.

According to the present invention, there is provided a pipe joint having a socket provided with an annular groove for receiving a rubber ring seal, the internal surface of the socket having two conic parts which axially diverge from the circumferential edges of the annular groove to the opposite directions along two conic surfaces with the same vertical angles, respectively.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 7 is a perspective view of a rubber ring seal;

FIG. 8 is a longitudinal sectional perspective view of the socket of a pipe joint according to the present invention;

FIG. 9 is an enlarged view of a part of FIG. 8;

FIG. 10 is a fragmentary sectional view of a pipe to be inserted in the socket;

DETAILED DESCRIPTION OF THE PREFERRED EMBODIMENTS

Figure 1:
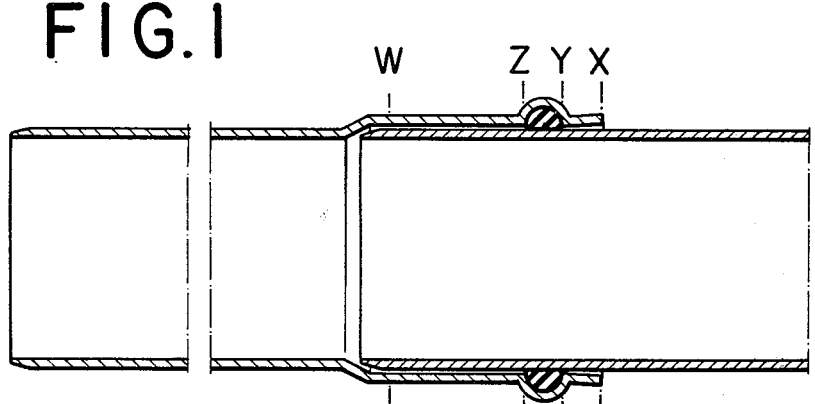
FIGS. 1 to 6 are longitudinal sectional views of the various examples of the typical conventional pipe joint of the type having a socket provided with an annular groove for receiving a rubber ring seal, shown with a pipe inserted in the socket.
Figure 2:
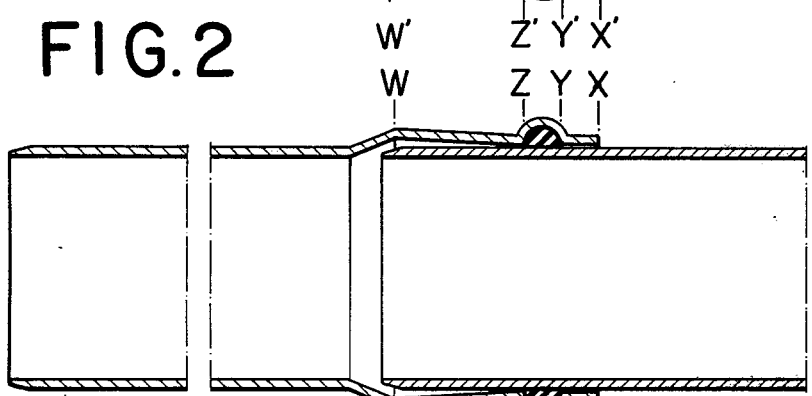
Figure 3:
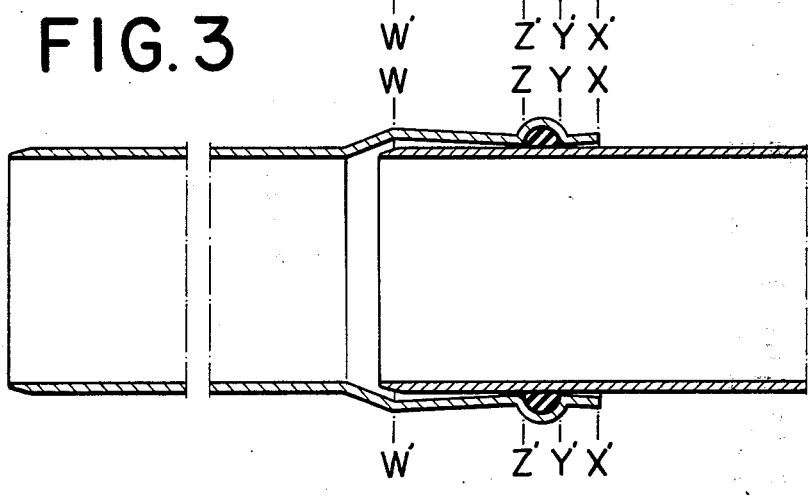
Figure 4:
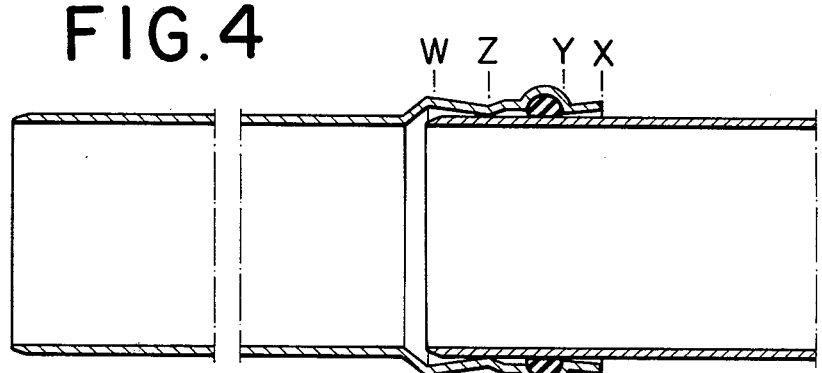
Figure 5:
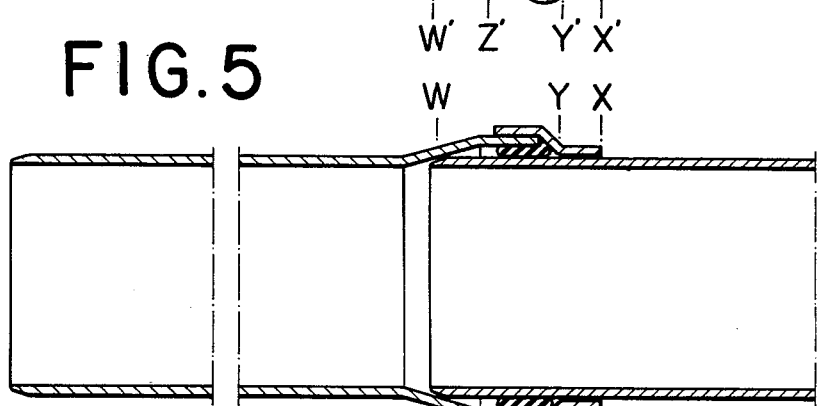
Figure 6:
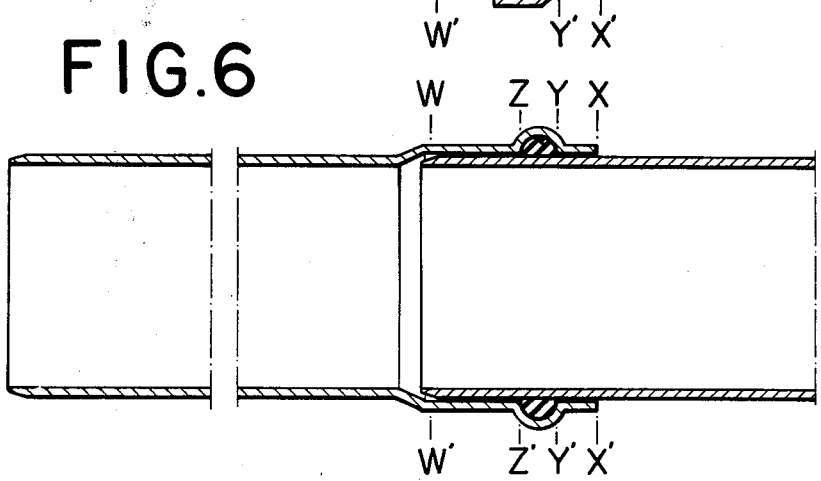

The pipe joint according to the present invention will be hereinafter described with reference to FIGS. 7 to 12.

A pipe joint 1a according to the present invention has a socket 4 provided with an annular groove 3 (FIGS. 8 and 9) for receiving a rubber ring seal 2 (FIG. 7). The socket 4, which receives a pipe 5 (FIG. 10) having an outside diameter of d, has an inside diameter of D at Section Y—Y' taken along the outside circumferential edge of the annular groove 3. A circle 6 having a diameter of $d_1$ is imaginarily provided on Section Y—Y' with its center on the axis 7 of the socket 4. The internal surface of the socket 4 has two conic parts one of which diverges outwardly from the outside circumferential edge of the annular groove 3 on Section Y—Y' to the end opening X—X' of the socket 4 and the other of which diverges-inwardly from the inside circumferential edge of the groove 3 on Section Z—Z' to Section W—W'. More particularly, the above two conic parts diverge to the opposite directions along two imaginary conic surfaces 9, respectively, which pass through the imaginary circle 6 mentioned above and has vertexes 10 with an vertical angle of $2\theta°$ on the axis 7 of the socket 4 at the opposite sides of Section Y—Y', respectively.

Figure 11:
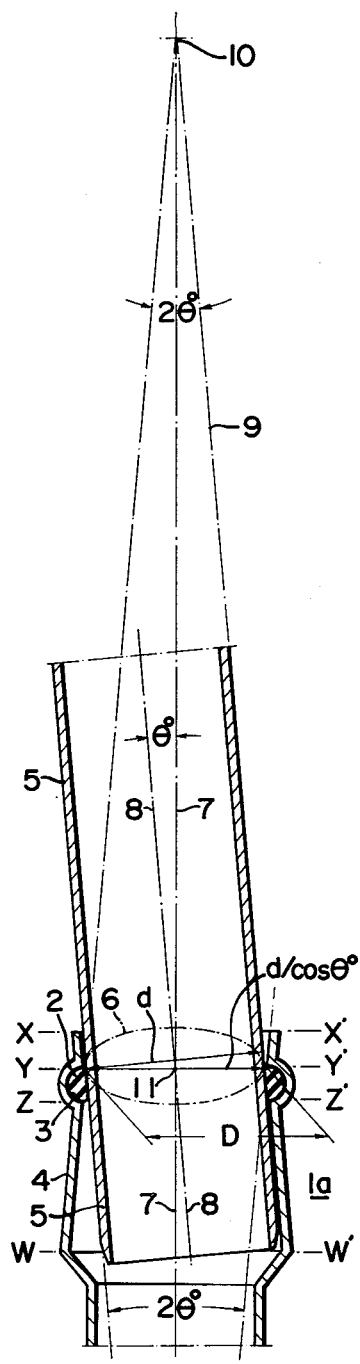
FIG. 11 is a longitudinal sectional view of a pipe joint provided with a socket according to the present invention, shown with a pipe inserted in the socket and inclined at the maximum inclination with respect to the axis of the socket.

In such a construction mentioned above, when the pipe 5 having an outside diameter of d is inserted in the socket 4 having an inside diameter of D at Section Y—Y' and the axis 8 of the pipe 5 is inclined at $\theta°$ with respect to the axis 7 of the socket 4 or the pipe joint 1a, the axis 8 of the inserted pipe 5 is rotated through $\theta°$ about the intersection 11 between the axis 7 of the socket 4 and Section Y—Y' and thereby the outside surface of the pipe 5 in the socket 4 comes into linear contact with the above-mentioned two conic parts of the internal surface of the socket 4 almost at the same time at between the end opening X—X' and Section Y—Y' and between Section Z—Z' and Section W—W' as shown in FIG. 11. In this state, the intersection between the outside surface of the pipe 5 and Section Y—Y' takes an ellipse and the major axis thereof becomes $d/\cos\theta°$ in length. Since the value d is smaller than the value $d/\cos\theta°$, the following relationship can be obtained:

$$D - d > D - (d/\cos\theta°)$$

Thus the clearance between the internal surface of the socket 4 and the outside surface of the pipe 5 at Section Y—Y' becomes smaller than before the pipe 5 is inclined at $\theta°$. Accordingly, the rubber ring seal 2 mounted in the annular groove 3 can be prevented from being easily dislocated or slipping off. In addition, the pipe 5 in the socket 4 comes in linear contact with the internal surface of the socket 4 as mentioned above, and therefore the pipe 5 and the pipe joint 1a are not subjected to large deformations or damage due to strong local stresses unlike in the case of the conventional pipe joint.

Figure 12:
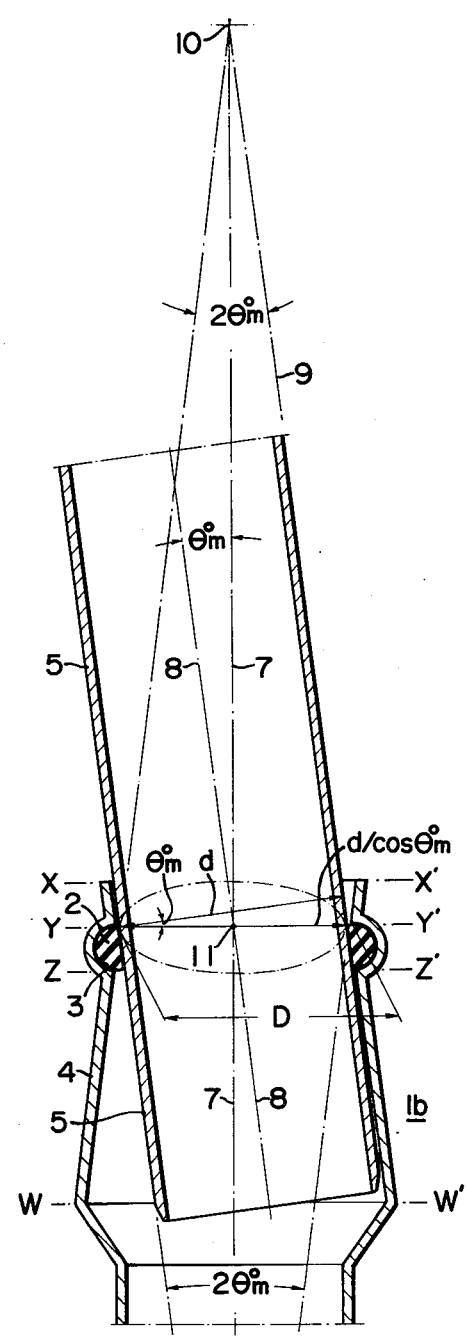
FIG. 12 is a longitudinal sectional view of a pipe joint provided with a socket capable of permitting the maximum allowable inclination according to the present invention, shown with a pipe inserted in the socket and inclined at the maximum allowable inclination with respect to the axis of the socket.

A socket 4 according to the present invention which permits a maximum inclination $\theta°m$ of the inserted pipe 5 with respect to the pipe joint 1a can be formed as follows:

In this embodiment, an angle of $\theta°$ having a relationship of "$D \approx d/\cos\theta°$" is adopted as the angle $\theta°m$, and the socket 4 is formed as shown in FIG. 12 according to almost the same method as shown in FIGS. 8 and 9. The socket 4, which receives the pipe 5 having an outside diameter of d, has an inside diameter of D at Section Y—Y' taken along the outside circumferential edge of the annular groove 3. The circle 6 having a diameter of $d_1$ is imaginarily provided on Section Y—Y' with its center on the axis 7 of the socket 4. The internal surface of the socket 4 has two conic parts one of which diverges outwardly from the outside circumferential edge of the annular groove 3 on Section Y—Y' to the end opening X—X' of the socket 4 and the other of which diverges inwardly from the inside circumferential edge of the groove 3 on Section Z—Z' to Section W—W'. More particularly, the above two conic parts diverge to the opposite directions along two imaginary conic surfaces 9, respectively, which pass through the imaginary circle 6 mentioned above and has vertexes 10 with an vertical angle of $2\theta°m$ on the axis 7 of the socket 4 at the opposite sides of Section Y—Y', respectively. Thus the pipe joint 1b can be obtained which permits a maximum allowable angle of $\theta°m$. This embodiment has the same operation and effects as the above-mentioned embodiment. In addition, this embodiment can be incorporated into various pipe joints to give them excellent features as will be known from the following comparison:

In this comparison, conventional pipe joints used are produced according to the numerical values of the inside diameter D' of socket, the outside diameter d' of the pipe to be inserted, and the depth l' of pipe insertion specified in the above-mentioned standard of the hard polyvinyl chloride RR single-supported straight pipe, and the pipe joints of the present invention used are also produced according to the above-mentioned numerical values. A comparison between the maximum allowable inclination of the above conventional pipe joints and that of the pipe joints of the present invention is shown in the following table:

| Nominal dia. of pipe (mm) | Maximum allowable inclination $\theta°$ m | |
|---|---|---|
| | Pipe joint for RR single-supported straight pipe | Pipe joint of the present invention |
| 75 | 0.63 | 7.16 |
| 100 | 0.63 | 6.77 |
| 150 | 0.68 | 6.60 |
| 200 | 0.74 | 6.73 |

It is understood from this table that the maximum allowable inclination of the pipe joint 1b according to the present invention is far greater than that of the conventional pipe joint, and in addition, that the pipe joint according to the present invention can achieve a long-awaited pipe inclination of more than 4° to 5° in practical use.

As mentioned above, such conventional pipe joints as shown in FIGS. 1 to 6 have disadvantages in that the rubber ring seal in the annular groove tends to be easily dislocate or slip off due to internal pressures and, for this reason, the clearance between the internal surface of the socket and the outside surface of the inserted pipe is inevitably minimized and therefore the pipe joint and the pipe must be made high in dimensional accuracy. Consequently, the conventional pipe joint is low in productivity and economy. On the other hand, the pipe joint of the present invention can eliminate these disadvantages of the prior art.

Obviously, numerous modifications and variations of the present invention are possible in light of the above teachings. It is therefore to be understood that within the scope of the appended claims, the invention may be practiced otherwise than as specifically described herein.

What is claimed is:

1. a pipe joint having a one-piece socket assembly provided with an annular groove for receiving a rubber ring seal, the internal surface of said socket comprising tow conic parts which axially diverge from the circumferential edges of said groove to the opposite directions along two conic surfaces with identical vertical angles, respectively, such that said two conic parts formed along said two conic surfaces, respectively, pass through a circle having a larger diameter than a pipe to be inserted and imaginarily provided on a section taken along the outside circumferential edge of said groove with its center on the axis of said socket and which have vertexes with identical vertical angles on the axis of the socket at the opposite sides of said section and diverge from the circumferential edges of said groove inwardly and outwardly, respectively, wherein said vertical angle is $2\theta°$ and has the following relationship when the inclination of said pipe to be inserted is assumed to be $\theta°$:

$$D = d/\cos\theta°$$

wherein D is the inside diameter of the socket at the section taken along the outside circumferential edge of the groove and d is the outside diameter of the pipe to be inserted and wherein $\theta°$ is greater than 4°.

2. A pipe joint as set forth in claim 1, wherein $\theta°$ is greater than 5°.

* * * * *